US009238886B2

(12) United States Patent
Ryoo et al.

(10) Patent No.: US 9,238,886 B2
(45) Date of Patent: Jan. 19, 2016

(54) CLOTHES DRYER

(75) Inventors: Byeongjo Ryoo, Seoul (KR); Sungmin Ye, Seoul (KR); Seonghwan Kim, Seoul (KR); Seungphyo Ahn, Seoul (KR); Sungho Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1128 days.

(21) Appl. No.: 13/205,418

(22) Filed: Aug. 8, 2011

(65) Prior Publication Data

US 2012/0030960 A1 Feb. 9, 2012

(30) Foreign Application Priority Data

| Aug. 9, 2010 | (KR) | 10-2010-0076477 |
| Aug. 9, 2010 | (KR) | 10-2010-0076481 |
| Aug. 9, 2010 | (KR) | 10-2010-0076484 |
| Oct. 12, 2010 | (KR) | 10-2010-0099497 |
| Oct. 12, 2010 | (KR) | 10-2010-0099499 |

(51) Int. Cl.
*D06F 58/26* (2006.01)
*D06F 58/24* (2006.01)
(Continued)

(52) U.S. Cl.
CPC .............. *D06F 58/26* (2013.01); *D06F 58/02* (2013.01); *D06F 58/206* (2013.01); *D06F 58/28* (2013.01);
(Continued)

(58) Field of Classification Search
CPC ......... D06F 58/02; D06F 58/20; D06F 58/24; D06F 58/26; D06F 58/206; D06F 2058/2854; D06F 2058/2864; D06F 2058/287; D06F 2058/2832

USPC ........... 34/86, 84, 77, 73, 219, 131, 569, 570, 34/468, 471, 475, 476, 477
See application file for complete search history.

(56) References Cited

U.S. PATENT DOCUMENTS 3,739,487 A * 6/1973 Clark ................................. 34/77
3,831,294 A * 8/1974 Freze ................................. 34/77
(Continued)

FOREIGN PATENT DOCUMENTS

CN 102762791 A 10/2012
EP 0467188 * 1/1992 .............. D06F 58/20
(Continued)

OTHER PUBLICATIONS

Partial English Machine Translation: EP 0467188. Accessed Nov. 26, 2014.*

*Primary Examiner* — Kenneth Rinehart
*Assistant Examiner* — Tavia Sullens
(74) *Attorney, Agent, or Firm* — Birch Stewart Kolasch & Birch, LLP

(57) ABSTRACT

Disclosed is a clothes dryer having a heat pump, the clothes dryer capable of enhancing energy efficiency by recovering waste heat to the maximum in correspondence to a capacity of the heat pump, capable of enhancing reliability by preventing overheating of a compressor and a heat exchange means, and capable of shortening drying time. The clothes dryer includes a body, drum rotatably installed in the body, a suction duct installed at the body, and configured to suck external air and to supply the external air into the drum, an exhaustion duct configured to exhaust air having passed through the drum to outside of the body, and a heat pump having a heat exchange means for recovering waste heat by heat-exchanging air passing through the exhaustion duct, wherein part of the air exhausted via the exhaustion duct is heat-exchanged with the heat exchange means of the heat pump.

8 Claims, 16 Drawing Sheets

(51) Int. Cl.
*D06F 58/02* (2006.01)
*D06F 58/28* (2006.01)
*D06F 58/20* (2006.01)

(52) U.S. Cl.
CPC ......... *D06F 58/20* (2013.01); *D06F 2058/2854* (2013.01); *D06F 2058/2864* (2013.01); *Y02B 30/52* (2013.01)

(56) References Cited

U.S. PATENT DOCUMENTS

| | | | |
|---|---|---|---|
| 4,137,645 | A | 2/1979 | Bullock |
| 2004/0089031 | A1 | 5/2004 | Kim et al. |
| 2006/0156767 | A1 | 7/2006 | Kim et al. |
| 2008/0034607 | A1 | 2/2008 | Ahn et al. |
| 2010/0132217 | A1 | 6/2010 | Steffens |
| 2010/0154248 | A1* | 6/2010 | Stolze ............... 34/77 |

FOREIGN PATENT DOCUMENTS

| | | |
|---|---|---|
| EP | 1 650 344 A2 | 4/2006 |
| EP | 1 983 094 A1 | 10/2008 |
| EP | 2 202 347 A1 | 6/2010 |
| EP | 2194183 A2 | 6/2010 |
| EP | 2 565 323 A | 3/2013 |
| JP | 2007-143720 A | 6/2007 |
| WO | WO 2008/018245 A1 | 2/2008 |
| WO | WO 2010/003936 A1 | 1/2010 |

\* cited by examiner

CLOTHES DRYER

CROSS-REFERENCE TO RELATED APPLICATION

This application claims the benefit of Korean Patent Application No. 10-2010-0076477, filed on Aug. 9, 2010, Korean Patent Application No. 10-2010-0076481, filed on Aug. 9, 2010, Korean Patent Application No. 10-2010-0076484, filed on Aug. 9, 2010, Korean Patent Application No. 10-2010-0099497, filed on Oct. 12, 2010, Korean Patent Application No. 10-2010-0099499, filed on Oct. 12, 2010 which are hereby incorporated by reference for all purposes as if fully set forth herein.

BACKGROUND OF THE INVENTION

1. Field of the Invention

This specification relates to a clothes dryer, and more particularly, to a clothes dryer having a heat pump and heat exchange means, the clothes dryer capable of enhancing energy efficiency by recovering waste heat to the maximum in correspondence to a capacity of the heat pump, capable of enhancing reliability by preventing overheating of a compressor and the heat exchanging means, and capable of shortening drying time.

2. Background of the Invention

Generally, a clothes dryer serves to dry laundry by introducing the laundry having been completely washed and dehydrated into a tub (drum), and by supplying hot air into the drum so as to evaporate moisture of the laundry.

The hot air supplied into the drum is discharged out with the moisture of the laundry. This high-temperature and humid air may be processed in various manners. According to a method for processing the high-temperature and humid air, the clothes dryer may be classified.

More concretely, the clothes dryer may be classified into a condensation type clothes dyer for condensing moisture included in air by cooling humid air, by making high-temperature and humid air heat-exchanged at a heat exchanger inside the clothes dryer, through circulation without exhaustion to the outside, and an exhaustion type clothes dryer for exhausting high-temperature humid air passing through a drum to the outside.

This clothes dryer will be explained in brief with taking the exhaustion type as an example. FIG. 1 is a schematic view of an exhaustion type clothes dryer in accordance with the conventional art. The clothes dryer comprises a body 1 having a door 2 on a front surface thereof, a drum 3 rotatably installed in the body 1 and having a plurality of lifters 4 protruding from an inner circumferential surface thereof, driving means configured to provide a rotational force to the drum 3, a heater 5 configured to generate hot air by heating sucked external air to a high temperature, a suction duct 7 communicated with a rear side of the drum 3 and configured to guide the hot air generated by the heater 5 to an inner side of the drum 3, a lint duct 8 communicated with a front side of the drum 3 and configured to guide humid air exhausted after a drying operation to an exhaustion duct 15, and a blower 13 installed at a rear side of the lint duct 8 and configured to generate a blowing force. At an entrance of the lint duct 8, installed is a filter 14 configured to filter foreign materials such as dust or naps from air discharged from the drum 3.

The driving means for rotating the drum 3 consists of a motor 10, a driving pulley 11 coupled to the motor 10, and a driving belt 12 connected to the driving pulley 11 and encompassing an outer circumferential surface of the drum 3. Once the driving pulley 11 is rotated by rotation of the motor 10, the driving belt 12 wound on the driving pulley 11 is rotated to rotate the drum 3.

A drying operation of the clothes dryer will be explained.

Firstly, an object to be dried such as laundry is introduced into the drum 3. Then, a drying operation is performed to operate the heater 5 and the motor 10 and to rotate the drum 3 and the blower 13. As the blower 13 is operated, external air is sucked to be heated by the heater 5. Then, the heated air is forcibly introduced, through the suction duct 7, into the drum 3 being rotated. Then, the heated air introduced into the drum 3 dries the laundry by evaporating moisture of the laundry, and then passes through the lint duct 8 and the exhaustion duct 15, sequentially to be discharged out in a humid state.

Generally, the exhaustion type clothes dryer has advantages that the entire drying time is shortened owing to rapid heating by the heater, and massive fabrications are possible. However, the exhaustion type clothes dryer has a disadvantage such as a large amount of energy consumption, since introduced air is heated only by the heater and then is discharged out. More concretely, the amount of energy lost without being used in a drying operation in the drum corresponds to 30~40% of the entire energy, and the amount of energy exhausted through the exhaustion duct corresponds to about 80% of the entire energy. This may result in a great deal of wasted energy.

In order to solve this waste of energy, heat exchange means may be used to recover part of waste energy. However, in this case, the heat exchange means may be overheated due to a limitation of a capacity. Furthermore, a fan may be additionally installed so as to enhance heat exchange efficiency by supplying a large air volume. Especially, a compressor used in a heat pump serving as the heat exchange means may be overheated. In the case that the compressor is overheated, reliability of the dryer may be degraded, and compression efficiency of a refrigerant may be degraded. This may lower the entire heat exchange efficiency.

On the other hand, the condensation type clothes dryer has advantages that an exhaustion duct for exhausting air to the outside is not required, and energy efficiency is high. However, the condensation type clothes dryer has disadvantages that designing the heat exchange means is restricted according to a performance or a capacity since waste heat is partially recovered to be used as air to be supplied into the drum, drying time is long, and massive fabrications are not easy. Especially, in the case of drying time, it takes more about three times than in the exhaustion type clothes dryer.

SUMMARY OF THE INVENTION

Therefore, an object of the present invention is to provide a clothes dryer having a heat pump for shortening drying time and preventing waste of energy, the clothes dryer capable of reducing the amount of wasted energy by recovering waste heat to the maximum in correspondence to a capacity of the heat pump, and capable of preventing an overload from occurring on the heat pump.

Another object of the present invention is to provide a clothes dryer capable of preventing overheating of a compressor of a heat pump, and capable of recovering waste heat using the same.

Still another object of the present invention is to provide a clothes dryer capable of providing a large air volume so as to enhance efficiency of a heat pump.

Yet still another object of the present invention is to provide a clothes dryer capable of reducing power consumption by enhancing energy efficiency, and capable of improving reliability.

To achieve these and other advantages and in accordance with the purpose of the present invention, as embodied and broadly described herein, there is provided a clothes dryer, comprising: a body; a drum rotatably installed in the body; a suction duct installed at the body, and configured to suck external air and to supply the external air into the drum; an exhaustion duct configured to exhaust air having passed through the drum to outside of the body; and a heat pump having a heat exchange means for recovering waste heat by being heat-exchanged with air passing through the exhaustion duct, wherein part of the air exhausted via the exhaustion duct is heat-exchanged with the heat exchange means of the heat pump.

The heat pump may include a first heat exchanger installed on a flow path of the suction duct, and configured to heat sucked air; a second heat exchanger installed on a flow path of the exhaustion duct, and configured to cool exhausted air; and a compressor and an expander connected between the first and second heat exchangers by pipes, and constituting the heat pump, wherein part of the air exhausted via the exhaustion duct is heat-exchanged with the second heat exchanger.

Under the configuration of the first embodiment, waste heat may be absorbed from part of high-temperature and humid air exhausted from the drum, only within the range of a capacity of the heat pump, and the rest of the high-temperature and humid air may be exhausted to the outside. This may reduce the amount of wasted energy, and prevent an overload from occurring on the heat pump. As a result, power consumption may be reduced, and reliability of the operation of the heat pump may be enhanced.

The clothes dryer may further comprise a heater disposed at a downstream side of the second heat exchanger of the suction duct, and configured to heat air supplied into the drum. The heater may be implemented so as to rapidly supply a large amount of heat energy into the drum, and to stably operate the heat pump.

The first embodiment may have various modification examples.

The exhaustion duct may be set to have a sectional area larger than that of the second heat exchanger. One or more flow control means may be further provided so as to control a flow amount on part where the sectional area of the exhaustion duct is larger than the sectional area of the second heat exchanger.

Under this configuration, only part of exhausted air may be used to recover waste heat. As a result, without requiring an additional apparatus, only air passing through part of the exhaustion duct corresponding to a sectional surface of the second heat exchanger may be heat-exchanged, but air passing through the rest of the exhaustion duct except for the part corresponding to the sectional surface of the second heat exchanger may be exhausted out without being heat-exchanged.

The clothes dryer may further comprise a bypass duct having one end communicated with an upstream side of the second heat exchanger at the exhaustion duct, and another end communicated with the outside of the body. The bypass duct may be provided with flow control means.

Under this configuration, an additional duct may be provided for controlling the amount of air which participates in heat exchange in correspondence to the amount of air which can be processed by the heat pump.

The clothes dryer may further comprise a controller, and the controller may control the flow control means such that a temperature of a refrigerant having passed through the second heat exchanger is within a preset range. And, the controller may determine a flow amount of air heat-exchange with the second heat exchanger within the range that the heat pump maintains a normal state.

In the first embodiment, a flow amount may be more efficiently controlled to stably operate the heat pump. Generally, the heat pump may be influenced by an operation temperature of a refrigerant for absorbing and emitting heat. And, the heat pump may be normally operated when a refrigerant is within a preset temperature range, but may be abnormally operated when the refrigerant is not within the preset temperature range. In this embodiment, the amount of high-temperature and humid air which is to transfer heat to a refrigerant via an evaporator of the heat pump may be controlled by the flow control means, thereby normally operating the heat pump.

According to a second embodiment of the present invention, the clothes dryer may further comprises a circulation duct diverged from the exhaustion duct, and configured to re-supply part of air passing through the exhaustion duct into the drum through circulation. The heat pump may include a second heat exchanger for cooling air, and a first heat exchanger for heating air, the heat exchangers sequentially installed on a flow path formed by the circulation duct; and a compressor and an expander connected between the first and second heat exchangers by pipes, and constituting the heat pump, wherein air passing through the circulation duct is heat-exchanged with the compressor at an upstream side of the first heat exchanger.

Part of air passing through the exhaustion duct without passing through the flow path on the circulation duct may be exhausted to outside of the body. Under this configuration of the second embodiment, waste heat may be absorbed from part of high-temperature and humid air exhausted from the drum, only within the range of a capacity of the heat pump, and the rest of the high-temperature and humid air may be exhausted to the outside. This may reduce the amount of wasted energy, and prevent an overload from occurring on the heat pump. As a result, power consumption may be reduced, and reliability of the operation of the heat pump may be enhanced.

In the second embodiment, overheating of the compressor provided on the heat pump, heat exchange means may be prevented, and waste heat occurring from the compressor may be recovered. This may reduce the amount of wasted energy, and prevent an overload from occurring on the heat pump. As a result, power consumption may be reduced, and reliability of the operation of the heat pump may be enhanced. Furthermore, a large air volume may be transferred to the drum through a circulation flow path of the circulation duct. This may enhance drying efficiency of the clothes dryer.

The clothes dryer of the second embodiment may further comprise a heater installed at the suction duct, and configured to heat sucked air. Air introduced into the drum through the suction duct may be mixed with air supplied by the circulation duct in the drum.

The suction duct and the circulation duct may come in contact with each other at a downstream side of the heater, and may be connected to the drum in a state flow paths thereof are separated from each other so as to prevent communication with each other. Alternatively, the suction duct and the circulation duct may be communicated with each other at a downstream side of the heater, and may be introduced into the drum with a mixture of air which flows on the flow paths.

The second embodiment may provide various modification examples to additionally supply air heated by the heater when it is difficult to supply a large amount of heat energy, with using air heated only through the circulation duct.

The compressor may be configured such that a surface thereof is exposed onto the flow path inside the circulation duct. Alternatively, the compressor may be positioned outside the circulation duct so as to perform heat exchange with air inside the circulation duct.

Each of the clothes dryers according to the first and second embodiments may further comprise a blower provided at an upstream side of the heater.

According to a third embodiment of the present invention, each of the clothes dryers according to the first and second embodiments may further comprise a heat transfer means installed between the compressor and air of a downstream of the first heat exchanger. The heat transfer means may be implemented as a heat pipe.

The heat transfer means may include a first heat sink contacting the surface of the compressor; and a second heat sink disposed at a downstream side of the first heat exchanger, and having a plurality of heat transfer fins on a surface thereof. When a surface temperature of the compressor is more than a preset value, the first heat sink may absorb heat from the compressor, and the second heat sink may emit the absorbed heat to air on a downstream side of the first heat exchanger. On the other hand, when the surface temperature of the compressor is less than the preset value, the second heat sink may absorb heat from the air on a downstream side of the first heat exchanger, and the first heat sink may transfer heat to the compressor for preheating of the compressor.

In the third embodiment, heat transfer may be performed, through the heat transfer means, between the compressor and the air on a downstream side of the first heat exchanger. This may allow recovery of waste heat to enhance energy efficiency, and prevent overheating of the compressor. As a result, power consumption may be reduced, and reliability of the operation of the compressor may be enhanced.

In the third embodiment, waste heat may be recovered not only to heat air, but also to preheat the compressor for a smooth operation of the compressor when the clothes dryer is initially operated.

The present invention may have the following advantages.

Firstly, waste heat may be absorbed from part of high-temperature and humid air exhausted from the drum, only within the range of a capacity of the heat pump, and the rest of the high-temperature and humid air may be exhausted to the outside. This may reduce the amount of wasted energy, and prevent an overload from occurring on the heat pump. As a result, power consumption may be reduced, and reliability of the operation of the heat pump may be enhanced.

Secondly, overheating of the compressor provided on the heat pump, heat exchange means may be prevented, and waste heat occurring from the compressor may be recovered. This may reduce the amount of wasted energy, and prevent an overload from occurring on the heat pump.

Thirdly, a large air volume required for a drying operation may be supplied. This may enhance drying efficiency of the clothes dryer.

Fourthly, heat transfer may be performed, through the heat transfer means, between the compressor and air supplied into the drum. This may allow recovery of waste heat to enhance energy efficiency, and prevent overheating of the compressor. As a result, power consumption may be reduced, and reliability of the operation of the compressor may be enhanced.

Fifthly, waste heat may be recovered not only to heat air, but also to preheat the compressor for a smooth operation of the compressor when the clothes dryer is initially operated.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

First Embodiment

Figure 1:
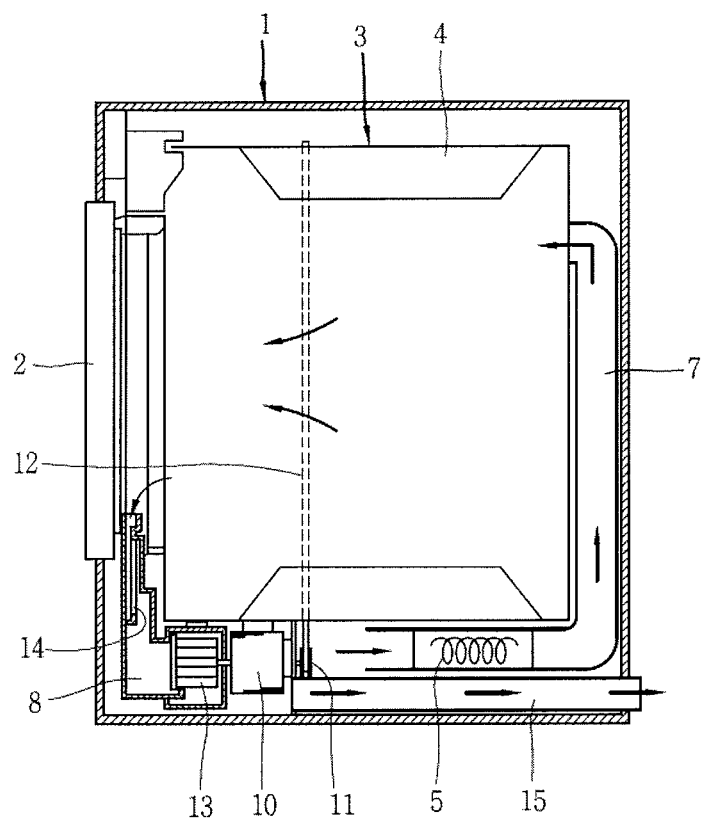
FIG. 1 is a schematic view of a clothes dryer in accordance with the conventional art.
Figure 2:
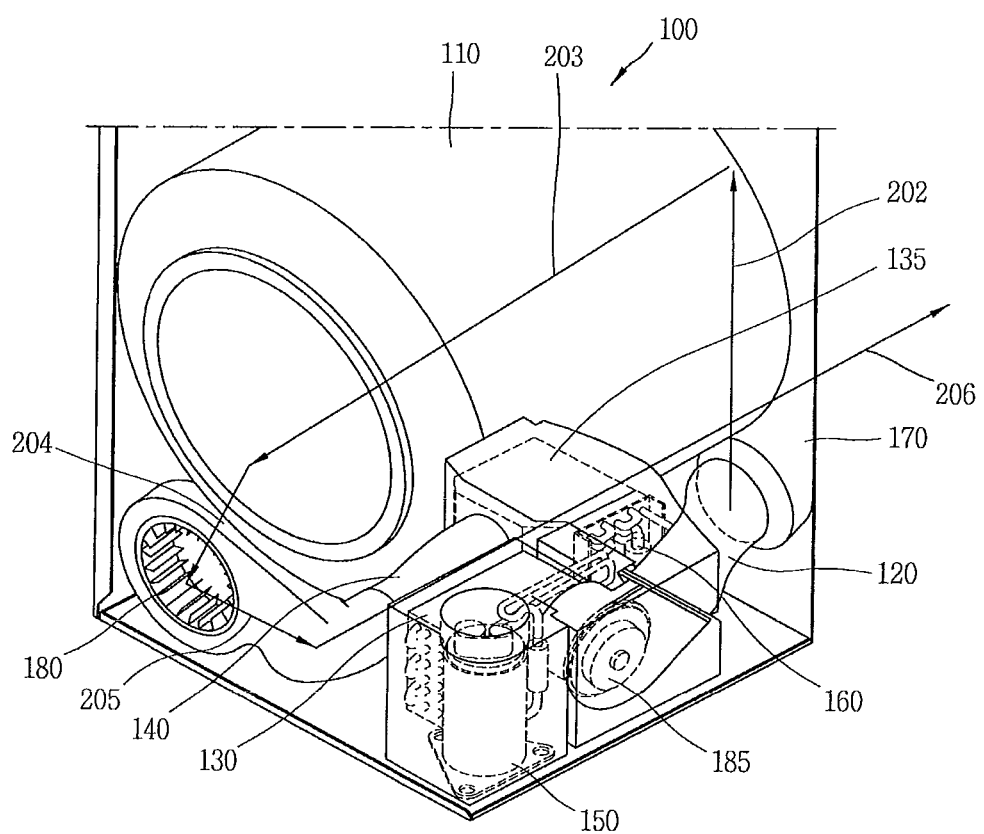
FIG. 2 is a schematic view of a clothes dryer according to a first embodiment of the present invention.

Referring to FIG. 2, a clothes dryer of the present invention comprises a body 100 which forms the appearance thereof, and a drum 110 rotatably installed in the body 100. The drum 110 is supported so as to be rotatable by supporters (not shown) disposed at front and rear sides.

At a rear side of the drum, a suction duct 120 is installed in upper and lower side directions of the drum by being extended from a lower portion of the body. The suction duct 120 is installed in the body, and configured to suck external air and to supply the sucked external air into the drum. By the suction duct, formed are suction flow paths 201 and 202 through which air sucked into the drum flows.

Air sucked through the suction duct 120 is introduced from the outside of the body. More specifically, external air may be introduced into the clothes dryer through an air inlet formed at a bottom surface or a side surface of the body. If air is sucked from the outside of the body, cool external air may be stably supplied. This may a heat pump to be later explained to be stably operated. Furthermore, this may prevent contamination of a heat exchanger due to foreign materials such as lint more effectively than in a case where air inside the body is reused. When external air is sucked from an air inlet formed at a lower portion of the body, the air is sucked in a reverse direction to a gravitational direction. Accordingly, if air flow is stopped when the clothes dryer is not used, foreign materials fall free thus to be naturally removed. Furthermore, a spatial utilization degree is enhanced since a first heat exchanger to be later explained is mounted in parallel to a lower portion of the body.

For smooth suction, an additional blower 185 may be provided at the suction duct. That is, when a capacity of a heat pump to be later explained is large, a condenser, a first heat exchanger is required to be cooled for prevention of overheating. Here, the additional blower 185 is used to increase the amount of sucked air for cooling the condenser by being heat-exchanged with the condenser. However, when the capacity of the heat pump is not large, the additional blower 185 may not be required.

A first heat exchanger 130 for heating sucked air is provided at the suction duct. In the first embodiment, the first heat exchanger 130 indicates a condenser. Inside the suction duct, installed is a heater 170 for heating sucked air to a high temperature required for a drying operation, as well as the first heat exchanger 130. The heater 170 rapidly supplies a large amount of heat energy into the drum, and serves to supply a larger amount of heat energy such that the heat pump is stably operated in a normal state. Details of the heater 170 will be later explained.

Air 203 introduced into the drum is heated by the first heat exchanger, or by the first heat exchanger and the heater 170, thereby being converted into high-temperature dry air having a temperature of about 150~250°. This air introduced into the drum in a high temperature state is used to dry laundry, and then is introduced into a front duct (not shown) disposed at a front lower portion of the drum (204). Then, the air passes through a lint filter (not shown) (205), and then is exhausted to the outside of the body via an exhaustion duct (206).

The exhaustion duct 140 is provided with exhaustion flow paths 204, 205 and 206 for exhausting hot air discharged from the drum to the outside. These exhaustion flow paths 204, 205 and 206 may be provided with a blower 180 for sucking air inside the drum and forcibly blowing the air to the outside of the clothes dryer.

At the exhaustion duct, installed is a second heat exchanger 135 for cooling exhausted air. The second heat exchanger 135 is implemented as an evaporator.

Figure 3:
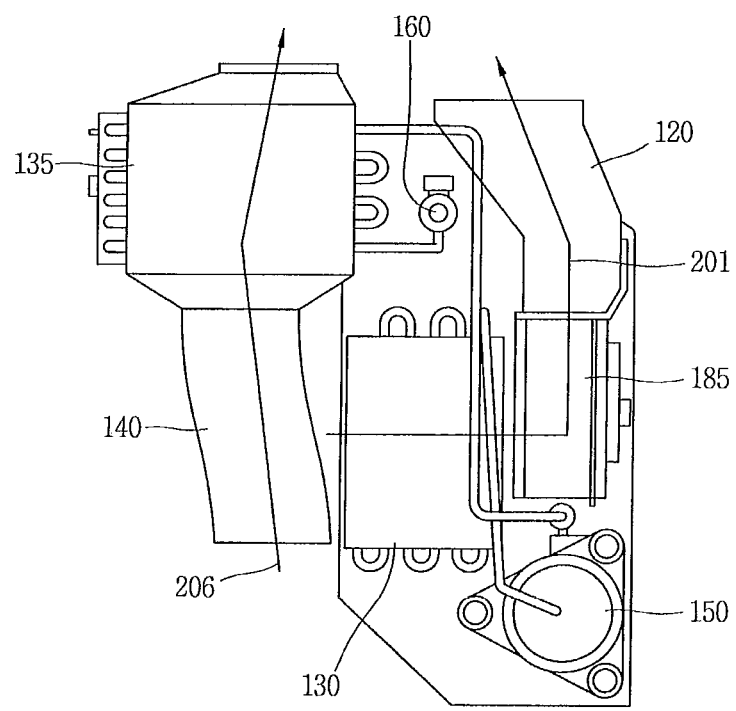
FIG. 3 is a schematic view of a heat pump of the clothes dryer according to a first embodiment of the present invention.

As shown in FIG. 3, the clothes dryer constitutes a heat pump by further comprising an expander 160 and a compressor 150 installed between the first heat exchanger 130 and the second heat exchanger 135, respectively. That is, the first heat exchanger 130, the expander 160, the second heat exchanger 135 and the compressor 150 are sequentially connected to one another by pipes, thereby constituting one heat pump.

At the heat pump, a refrigerant is heat-exchanged with middle-temperature and humid air discharged from the drum on the evaporator (second heat exchanger), thereby being converted into a gaseous state of a low temperature and a low pressure. At the compressor, the refrigerant is compressed to be in a gaseous state of a high temperature and a high pressure. At the first heat exchanger, the refrigerant is heat-exchanged with cold air to be introduced into the drum from the suction duct, thereby being converted into a liquid state of a high temperature and a high pressure. And, the refrigerant is expanded at the expander, thereby being converted a liquid state of a low temperature and a low pressure.

Accordingly, the refrigerant is heat-exchanged with the middle-temperature and humid air discharged exhausted via the exhaustion duct, thereby absorbing waste heat. As a result, the air exhausted via the exhaustion duct is cooled to be exhausted to the outside of the body in a state of a low temperature and low humidity.

Figure 4:
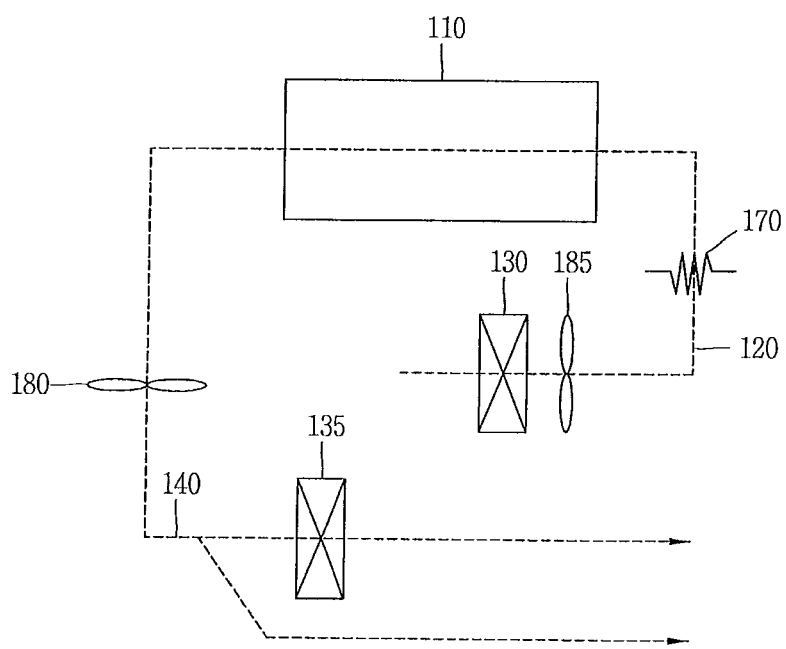
FIG. 4 is a schematic view of an air flow path of the clothes dryer according to a first embodiment of the present invention.

As shown in FIG. 4, part of the air exhausted through the exhaustion duct 140 is heat-exchanged with the second heat exchanger 135. That is, only part of the air exhausted through the exhaustion duct 140 is heat-exchanged with the second heat exchanger 135, but the rest is exhausted without being heat-exchanged.

Figure 5:
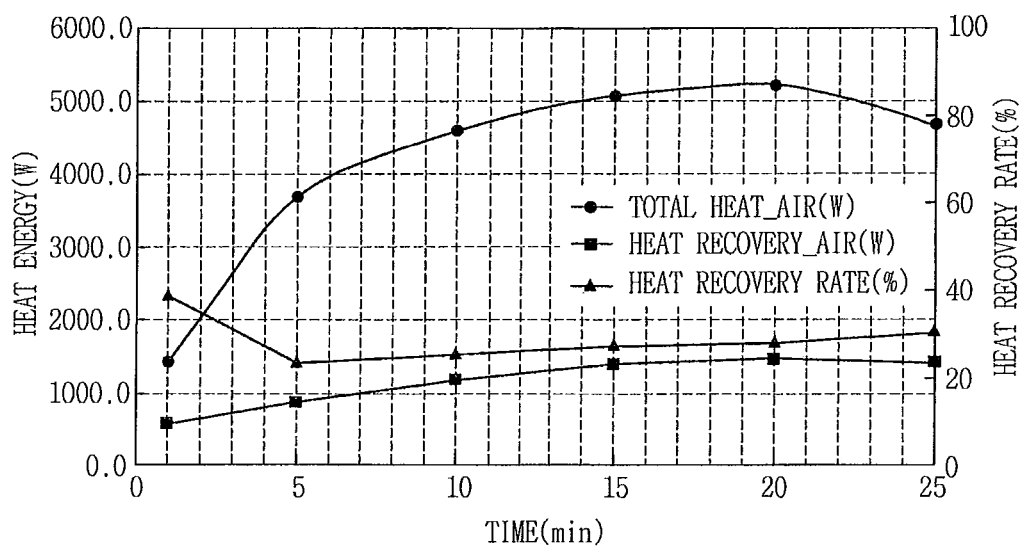
FIG. 5 is a graph illustrating of heat recovery of the clothes dryer according to a first embodiment of the present invention.

As shown in the graph of FIG. 5, waste heat is absorbed by the second heat exchanger from part of the high-temperature and humid air discharged from the drum only within a capacity of the heat pump. And, part of the rest is exhausted to the outside. This may reduce the amount of wasted energy, and prevent an overload from occurring on the heat pump.

More specifically, air introduced into the drum and used for a drying operation is not reused, but is exhausted to the outside of the clothes dryer. And, the heat pump is used to absorb only waste heat from the exhausted air, and to supply the absorbed waste heat to sucked air. Generally, only about 20% of heat energy introduced into the clothes dryer is used to perform a drying operation, and about 80% is not used to perform a drying operation. Accordingly, the waste heat is absorbed by using the heat pump. In this embodiment, provided are means for optimizing the heat pump so as to prevent the occurrence of an overload.

In case of the heat pump, a refrigerant has to be heat-exchanged by a phase change in a proper temperature and pressure. For this, used are a heat exchanger, a compressor, an expander, etc. In order to recover a larger amount of heat, the heat exchanger or the compressor has to have a large size. However, due to a spatial restriction of a general clothes dryer, the size of the heat exchanger, the compressor, etc. is limited. Furthermore, even if the heat exchanger is large and a heat exchange area is large, drying efficiency may be degraded since a flow path resistance of air is increased.

In the present invention, the heat pump is optimized with consideration of the size of the heat exchanger or the compressor, thereby recovering about 20~50% of waste heat. That is, only about 16~40% of the entire heat energy to be supplied is recovered by using the heat pump, thereby being re-supplied into sucked air.

As aforementioned, inside the suction duct, installed is the heater 170 for heating sucked air to a high temperature required for a drying operation, as well as the first heat exchanger 130. This may allow heat energy to be continuously supplemented to sucked air. If the heat pump is optimized with consideration of the size of the heat exchanger or the compressor so as to recover about 20~50% of waste heat, only about 16~40% of the entire heat energy to be supplied is recovered to be re-supplied into sucked air. In the present invention, drying time may be shortened since the heater 170 is used to continuously supplement heat energy.

In case of the heat pump, a refrigerant has to be heat-exchanged by a phase change in a proper temperature and pressure. For this, a sufficient amount of heat energy has to be supplied. Otherwise, a liquid compression of the refrigerant, etc. may occur. This may cause a cycle not to be stably operated to degrade reliability of the cycle. Accordingly, it is preferable for the heater 170 to supplement heat energy to air sucked into the drum so that the heat pump can be stably operated in a normal state.

FIG. 5 illustrates a recovery rate of waste heat according to time. Referring to FIG. 5, the entire heat energy to be supplied may be compared with recovered heat energy. After a certain time has lapsed, heat energy to be supplied is about 5000 W, waste heat is about 4400 (not shown), and a recovered heat energy is about 1500~1800 W. Accordingly, about 30~40% of the entire waste heat is recovered. The larger the evaporator is, the more waste heat is recovered. However, in this case, an overload may occur on the heat pump, and a large space of the clothes dryer may be occupied. Therefore, in the present invention, the heat pump was optimized to recover waste heat only within the range of a capacity thereof. This configuration may reduce power consumption and may enhance reliability of the operation of the heat pump more than the conventional configuration.

Figure 6:
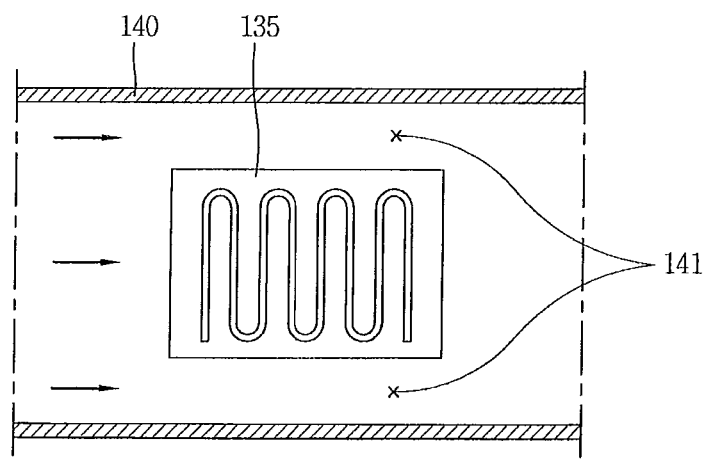
FIGS. 6 and 7 are schematic views illustrating various modifications of the clothes dryer according to a first embodiment of the present invention.

As shown in FIG. 6, the exhaustion duct 140 may have a sectional area 141 larger than that of the second heat exchanger 135. Accordingly, only air passing through the sectional area 141 of the exhaustion duct 140 corresponding to the sectional surface of the second heat exchanger participates in heat exchange, but air passing through other sectional areas of the exhaustion duct 140 larger than the sectional area of the second heat exchanger is exhausted to the outside without participating in heat exchange.

Under this configuration, part of air exhausted to the outside may be recovered without using an additional apparatus for recovering part of air exhausted to the outside and exhausting the rest to the outside.

The clothes dryer may further comprise one or more flow control means for controlling a flow amount on part where the sectional area of the exhaustion duct is larger than the sectional area of the second heat exchanger. As the flow control means, a damper may be used. This may allow a flow amount to be controlled more effectively.

Figure 9:
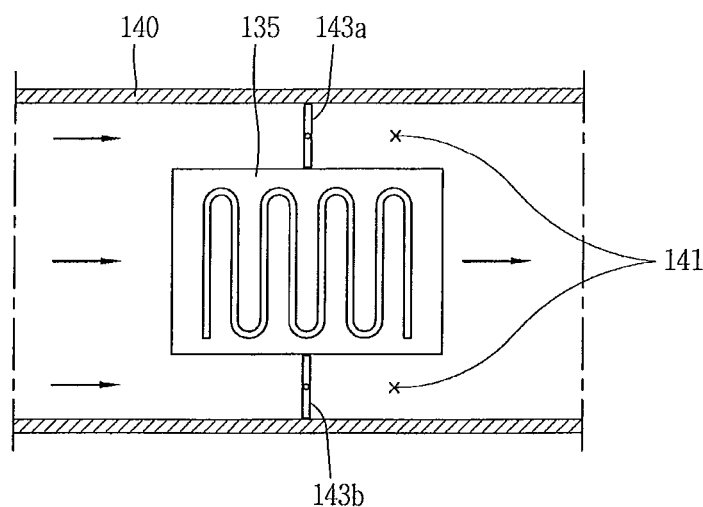
FIGS. 9 to 11 are schematic views illustrating controlling a flow amount of air by the controller of FIG. 8.
Figure 10:
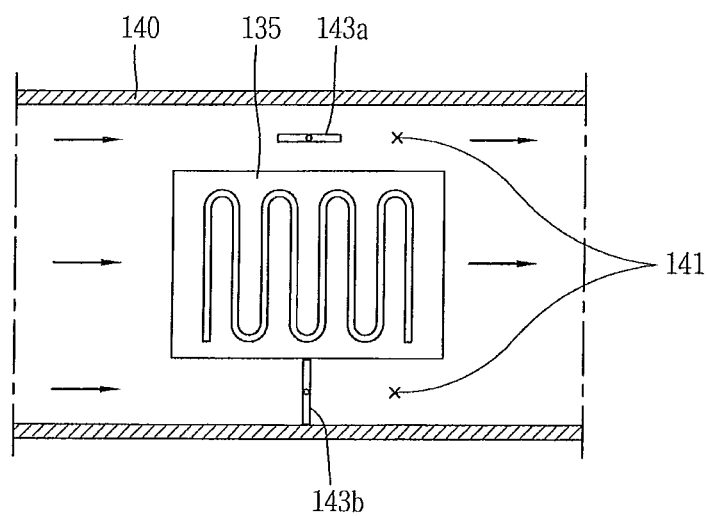
Figure 11:
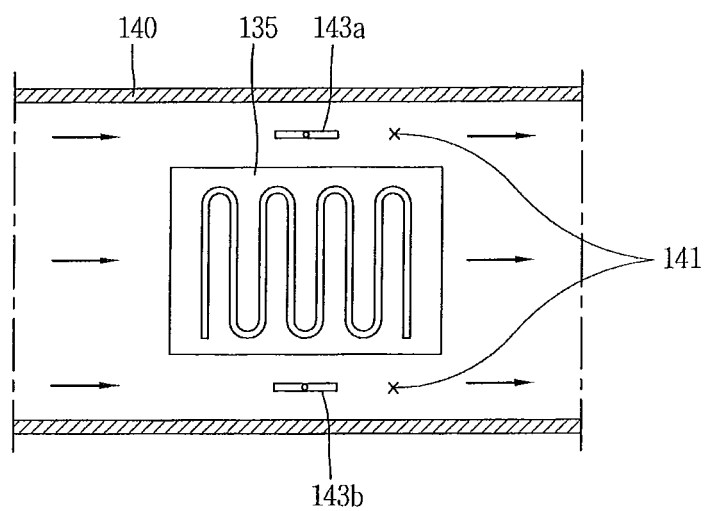

More specifically, as shown in FIGS. 9 to 11, dampers 143a and 143b, the flow control means are provided at upper and lower sides of the second heat exchanger, respectively. FIG. 9 illustrates a case where all of the dampers are closed, FIG. 10 illustrates a case where one of the dampers is closed, and FIG. 11 illustrates a case where all of the dampers are open.

Referring to FIG. 9, all of exhausted air passes through the second heat exchanger. The state of FIG. 9 may be implemented when the heat pump can sufficiently absorb waste heat. However, in this case, a flow path resistance on the exhaustion duct may be increased to prevent the entire air flow. As a result, a discharged air volume is limited to restrict a sucked air volume. This may reduce heat radiation of the condenser, the first heat exchanger for emitting heat. Furthermore, a pressure of a high pressure side of the heat pump may be increased, and the compressor may have lowered efficiency. That is, the heat pump may not be stably operated since the amount of sucked air which cools the condenser, a heating source is reduced. Furthermore, if the amount of sucked air is not sufficient, heat energy to be supplied into the drum is deficient. This may increase drying time and increase power consumption, thereby degrading efficiency of the clothes dryer.

FIG. 10 illustrates an operation to increase the amount of air exhausted to the outside without passing through the second heat exchanger, by partially opening the dampers, the flow control means when the efficiency of the clothes dryer is degraded in the state of FIG. 9. Referring to FIG. 10, an upper damper 143a is open but a lower damper 143b is closed, and vice versa. When compared with the operation of FIG. 9, the amount of air directly exhausted to the outside without passing through the second heat exchanger was increased in FIG. 10. In FIG. 10, the heat pump is operated more stably by reducing a flow resistance on the exhaustion duct, and by increasing the amount of sucked air.

FIG. 11 illustrates an operation to more increase the amount of air directly exhausted without passing through the second heat exchanger, than in the state of FIG. 10, by more opening the lower damper 143b. Accordingly, in FIG. 11, the heat pump is operated more stably, than in the state of FIG. 10, by reducing a flow resistance on the exhaustion duct, and by more increasing the amount of sucked air.

One of the operations of FIGS. 9 to 11 is applied according to an operation state of the clothes dryer. For instance, when the clothes dryer is in an initial operation state, the heat pump is also in an initial operation state thus to absorb a larger amount of waste heat. Accordingly, even if a heat-exchange amount of exhausted air with the second heat exchanger is large, a cycle is stable. Therefore, the operation of FIG. 9 is preferable. However, if a large load is applied to the heat pump as operation time (duration) of the clothes dryer is increased, a heat-exchange amount of exhausted air heat-exchanged with the second heat exchanger is required to be reduced for stabilization of the cycle. Therefore, the operation of FIG. 10 or FIG. 11 is preferable.

In this preferred embodiment, the clothes dryer is operated more stably by using the flow control means 143a and 143b.

In this preferred embodiment, the dampers are disposed at upper and lower sides of the second heat exchanger. However, the present invention is not limited to this. That is, the dampers may be disposed at right and left sides or right, left, upper and lower sides, only if the dampers are configured to control a flow amount of air passing through the exhaustion duct.

Figure 7:
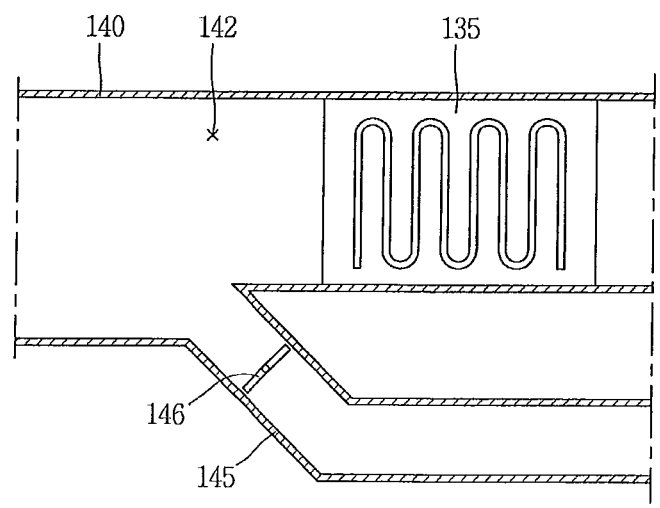

As a modification example of the exhaustion duct, as shown in FIG. 7, the clothes dryer may further comprise a bypass duct 145 having one end communicated with an upstream side 142 of the second heat exchanger at the exhaustion duct, and another end communicated with the outside of the body.

The bypass duct 145 is implemented to control the amount of air which participates in heat exchange in correspondence to the amount of air which can be processed by the heat pump. Accordingly, the bypass duct 145 is provided with a flow control means 146.

The flow control means may be implemented as a damper. Generally, the damper refers to an apparatus for controlling a flow amount of air passing through an exhaustion duct by being open or closed manually or by a controller.

Generally, the heat pump is influenced by an operation temperature of a refrigerant for absorbing heat and emitting heat. Accordingly, the heat pump is normally operated when the refrigerant is within a predetermined temperature range, and vice versa.

In this preferred embodiment, the heat pump is normally operated by controlling, by the flow control means, the amount of high-temperature and humid air which is to transfer heat to a refrigerant via the evaporator of the heat pump.

Figure 8:
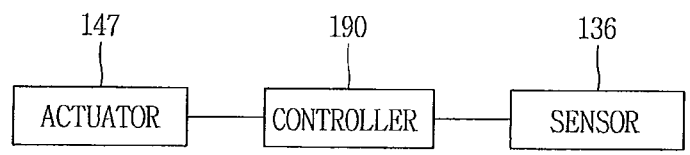
FIG. 8 is a schematic view of a controller of the clothes dryer according to a first embodiment of the present invention.

In this preferred embodiment, as shown in FIG. 8, the clothes dryer may further comprise a controller 190. The controller 190 is configured to control the flow control means 143*a*, 143*b* and 146 so that a refrigerant having passed through the second heat exchanger can be within a predetermined temperature range. For instance, as shown in FIG. 8, the controller 190 is electrically connected to a sensor 136 installed at the evaporator and an actuator 147 for actuating the flow control means. Under this configuration, the controller 190 controls the sensor 136 to measure a temperature of a refrigerant passing through the evaporator, and operates the actuator 147 in correspondence to the measured temperature of the refrigerant.

As aforementioned, the heat pump is generally influenced by an operation temperature of a refrigerant for absorbing heat and emitting heat. Accordingly, the heat pump is normally operated when the refrigerant is within a predetermined temperature range, and vice versa.

In this preferred embodiment, the heat pump is normally operated by controlling, by the flow control means, the amount of high-temperature and humid air which is to transfer heat to a refrigerant via the evaporator of the heat pump. Accordingly, the amount of air exhausted without contacting the second heat exchanger is determined, by the controller, within the range that the heat pump maintains a normal state.

Second Embodiment

Hereinafter, explanations about the same configurations and components of a second embodiment as those of the first embodiment will be omitted.

Figure 12:
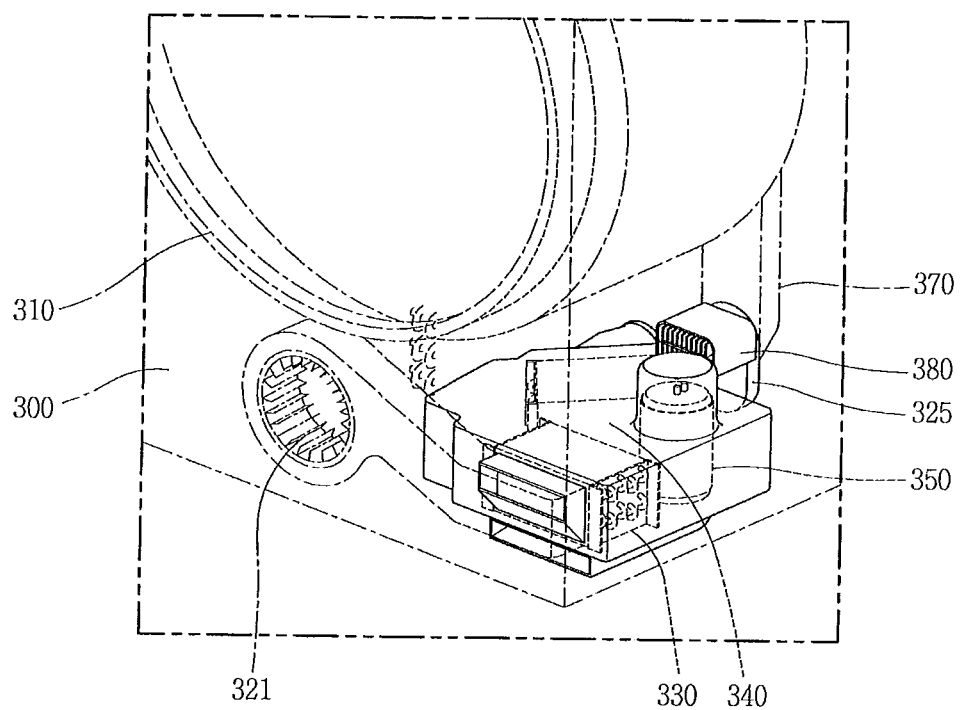
FIG. 12 is a schematic view of a clothes dryer according to a second embodiment of the present invention.

Referring to FIG. 12, a clothes dryer of the present invention comprises a body 300 which forms the appearance thereof, and a drum 310 rotatably installed in the body 300. At a rear side of the drum, a suction duct 370 is installed in upper and lower side directions of the drum in the body. The suction duct 370 is configured to suck external air and to supply the sucked external air into the drum. By the suction duct, formed is a suction flow path through which air sucked into the drum flows. Air sucked through the suction duct is introduced from the outside of the body, in a separate manner from air supplied by a circulation duct 320 to be later explained.

Inside the suction duct 370, installed is a heater 380 for heating sucked air to a high temperature required for a drying operation. The heater 380 rapidly supplies a sufficient amount of heat energy into the drum by receiving electric energy, and serves to supply a larger amount of heat energy such that a heat pump is stably operated in a normal state.

Under this configuration, heat energy required for a drying operation may be sufficiently supplied within a short time. This may shorten drying time. That is, additional heat energy is supplied within a short time because sufficient heat energy cannot be supplied with using only air on a circulation flow path formed by a circulation duct to be later explained.

Air introduced into the drum may be supplied by a circulation flow path formed by a circulation duct 320, in a separate manner from air supplied by the suction flow path. The circulation duct 320 is installed at the body, and re-supplies air discharged from the drum into the drum for circulation.

The air introduced into the drum is used to dry laundry, and then is introduced into a front duct (not shown) positioned at a front lower portion of the drum. Then, the air is exhausted to the outside of the body via a lint filter (not shown) and an exhaustion duct 360, sequentially. Here, part of the exhausted through the circulation duct 320 diverged from the exhaustion duct 360 is re-supplied into the drum. On the circulation flow path of the circulation duct, may be provided a blower 321 for sucking air inside the drum and forcibly blowing the sucked air to the outside of the clothes dryer.

On the circulation flow path formed by the circulation duct, a second heat exchanger 330 and a first heat exchanger 340 are sequentially installed. The second heat exchanger indicates an evaporator, and the first heat exchanger indicates a condenser. The evaporator 330 and the condenser 340 are a type of heat exchangers, and are configured to perform heat exchange between a refrigerant flowing in a heat pump with air on the circulation flow path like in the first embodiment.

Air introduced into the drum is heated by the heater 380 on the suction flow path, or the first heat exchanger 340 on the circulation flow path, thereby being converted into high-temperature dry air having a temperature of about 150~250°. This air introduced into the drum in a high temperature state is used to evaporate moisture of an object to be dried by contacting the object, and then is exhausted to the outside of the drum. In order to re-use air through circulation, the air has to be cooled to have moisture removed therefrom. Accordingly, air on the circulation flow path is cooled by being heat-exchanged with the second heat exchanger 330.

In order to re-supply air cooled by the evaporator 330, the second heat exchanger into the drum, the air has to be heated to have a high temperature. Here, the heating is performed by the condenser 340, the first heat exchanger. Detailed explanations about the heat pump will be omitted since they were aforementioned in the first embodiment.

In the first embodiment, the heat pump includes the evaporator 330 (second heat exchanger), the condenser 340 (first heat exchanger), the compressor 350 and the expander (not shown).

Figure 13:
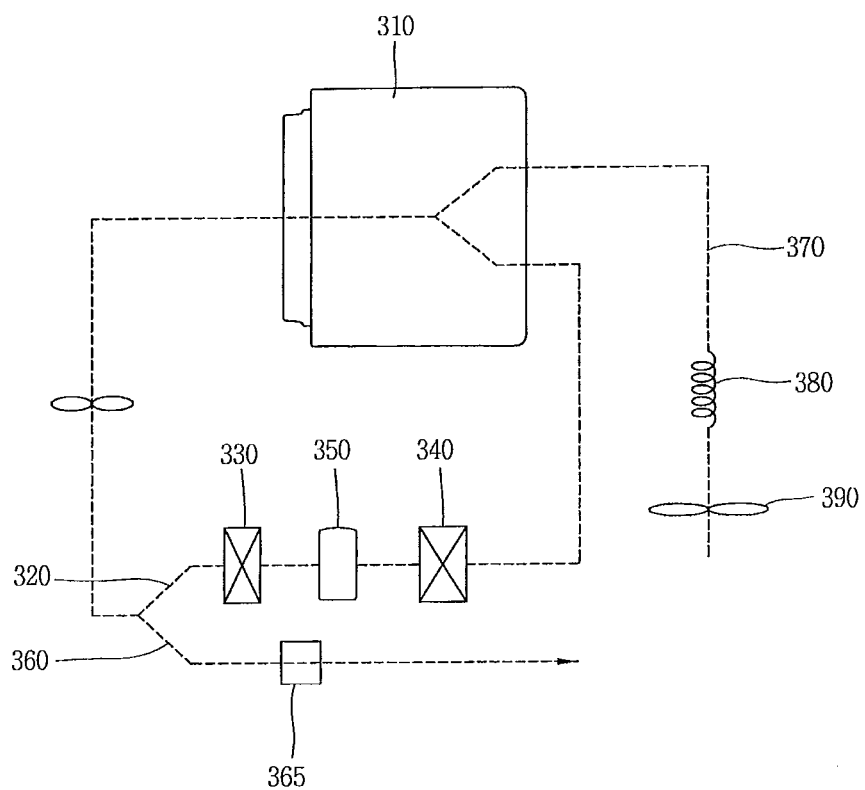
FIGS. 13 and 14 are schematic views of an air flow path of the clothes dryer according to a second embodiment of the present invention.
Figure 14:
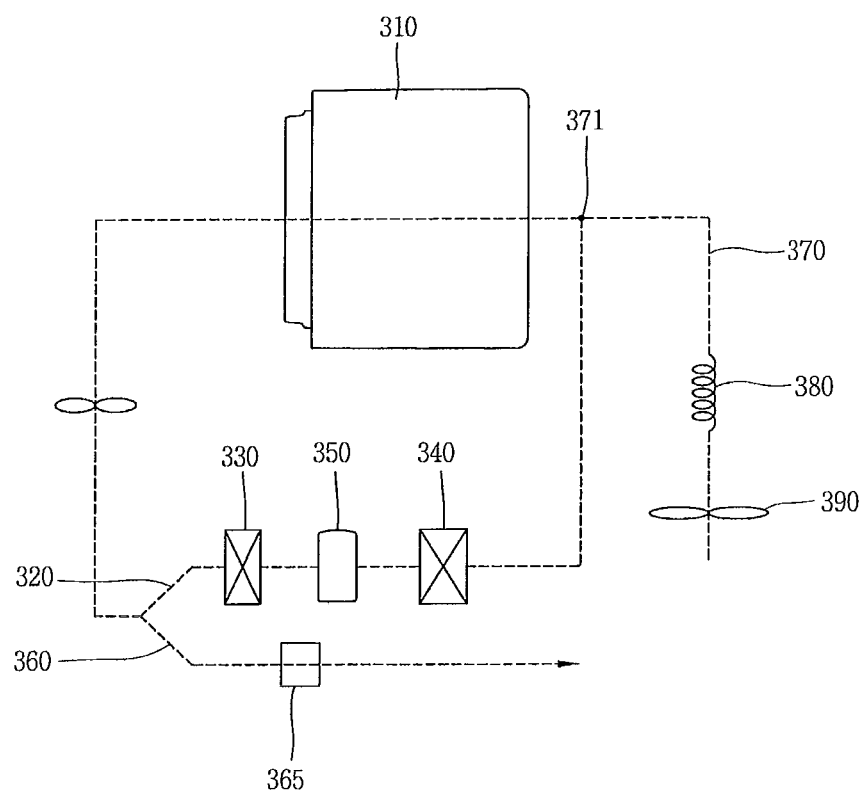

FIGS. 13 and 14 illustrate a flow path of air which is heat-exchanged with the heat pump. More concretely, in FIGS. 13 and 14, the line which connects the evaporator (second heat exchanger), the compressor, the condenser (first heat exchanger) to one another does not indicate a refrigerant flow path, but indicates an air flow path. The line indicates that heat exchange is performed as air sequentially contacts the evaporator, etc. More concretely, as shown in FIGS. 15 and 16, on the circulation flow path (indicated by the arrows of FIG. 15) formed by the circulation duct 320, sequentially formed are the second heat exchanger 330, the compressor 350 and the first heat exchanger 340.

As shown in FIGS. 13 and 14, air on the circulation flow path is heat-exchanged with the heat pump. That is, the air on the circulation flow path emits heat by performing heat exchange with the evaporator, and absorbs heat by performing heat exchange with the condenser. Consequently, the air on the circulation flow path re-absorbs the heat emitted therefrom.

Referring to FIGS. 13 and 14, the air on the circulation flow path is heat-exchanged with the compressor 350 at an upstream side of the condenser 340. Generally, heat exchange by the heat pump is performed by the evaporator and the condenser, the heat exchangers. However, in this preferred embodiment, air on the circulation flow path is heat-exchanged with the compressor so that waste heat emitted to the air can be absorbed again by the compressor.

Figure 15:
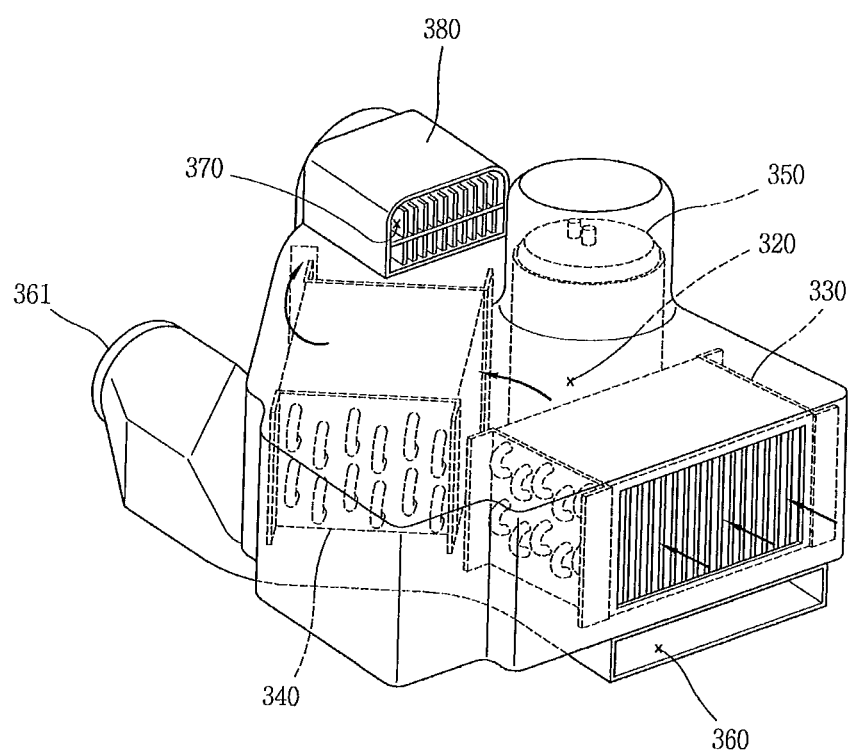
FIGS. 15 and 16 are partially-enlarged perspective views of the clothes dryer according to a second embodiment of the present invention.
Figure 16:
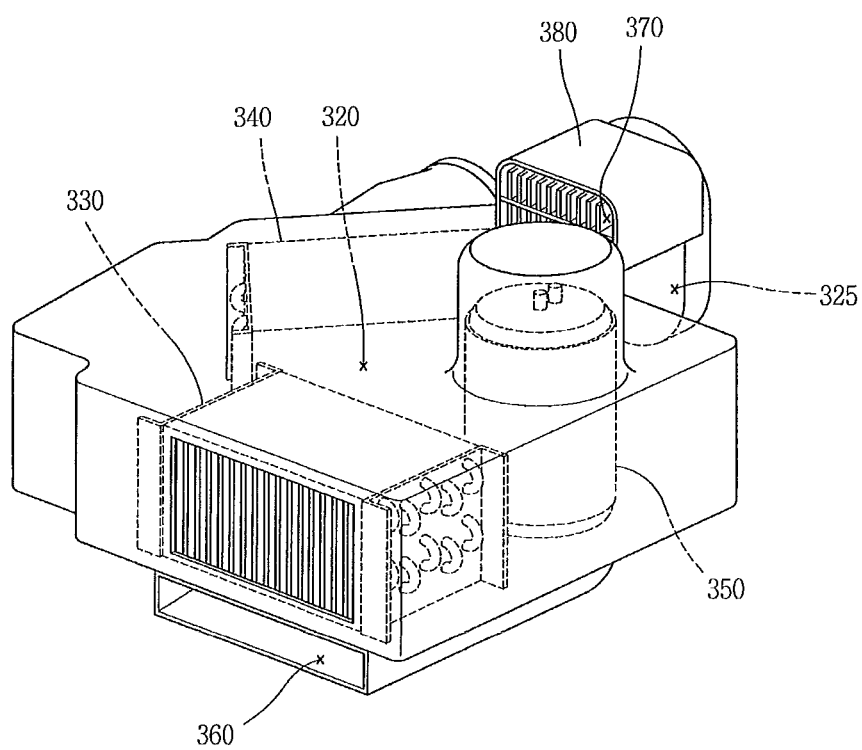

More specifically, as shown in FIGS. 15 and 16, the compressor may be configured so that a surface thereof can be exposed to the circulation flow path inside the circulation duct. Referring to FIGS. 15 and 16, one or more side surfaces of the compressor 350 are exposed to the circulation flow path formed in the circulation duct 320.

Figure 17:
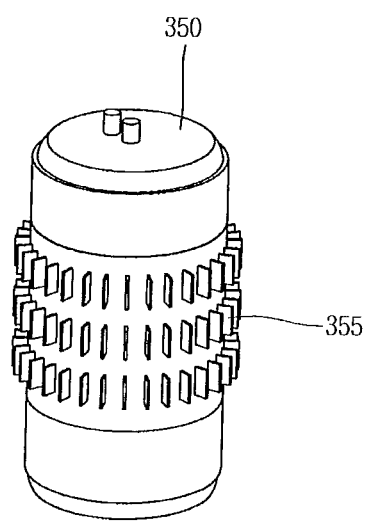
FIG. 17 is a perspective view of a compressor according to a second embodiment of the present invention.

As shown in FIG. 17, one or more radiation fins 355 may be provided on the surface of the compressor. Under this configuration, waste heat from the compressor may be recovered more efficiently, and the compressor may have a lowered temperature. This may enhance reliability and efficiency of the heat pump.

The compressor 350 may be disposed outside the circulation duct so as to be heat-exchanged with air inside the circulation duct. Under this configuration, the surface of the compressor and an outer side surface of the circulation duct may be in a contacted state with each other, or heat exchange means may be additionally mounted thereto.

The air changed into high-temperature air by being heat-exchanged with the heat pump through the circulation flow path is introduced into the drum together with air on the suction flow path, thereby participating in a drying operation.

Under the above configuration to transfer air into the drum through the circulation flow path, overheating of the compressor provided at the heat pump may be prevented, and waste heat generated from the compressor may be recovered. This may reduce the amount of wasted energy, and may prevent an overload from occurring from the heat pump. As a result, power consumption may be reduced, and reliability of the operation of the heat pump may be enhanced.

More specifically, part of air introduced into the drum to be used for a drying operation is not reused, but is exhausted to the outside of the clothes dryer. And, the heat pump is used to absorb only part of waste heat, and to supply the absorbed waste heat to air to be reused.

As aforementioned, in this preferred embodiment, the heater 380 is installed so as to heat air sucked into the suction duct, into a temperature required for a drying operation. The heater 380 continuously supplements heat energy to sucked air. Accordingly, air sucked into the drum may be supplemented with heat energy by the heater 380. This may allow the heat pump to be stably operated in a normal state.

Furthermore, since a large air volume may be transferred to the drum through the circulation flow path, an additional blower is less required and drying efficiency in the drum may be enhanced. However, it is preferable that an additional blower is installed on the suction flow path to provide a larger amount of air.

The additional blower 390 may prevent overheating of the heater 380 on the suction flow path by providing a larger amount of air. A configuration of the additional blower 390 is illustrated in FIGS. 13 and 14, and the additional blower 390 may be provided at an upstream side of the heater.

In this preferred embodiment, part of air is exhausted to the outside of the body at an upstream side of the evaporator on the circulation flow path. More specifically, as shown in FIGS. 13 to 15, the clothes dryer further comprises an exhaustion duct 360 diverged from an upstream side of the evaporator 330, the second heat exchanger of the circulation duct 320. And, the exhaustion duct is configured to exhaust part of air to the outside of the body at an upstream side of the evaporator on the circulation flow path. The exhaustion duct forms an exhaustion flow path through which hot air discharged from the drum is exhausted to the outside. As shown in FIG. 15, air is exhausted to the outside through an outlet 361 connected to the outside of the body.

Under this configuration of the second embodiment, waste heat may be absorbed from part of middle-temperature and humid air exhausted from the drum, only within the range of a capacity of the heat pump, and part of the rest of the middle-temperature and humid air may be exhausted to the outside. This may reduce the amount of wasted energy, and prevent an overload from occurring on the heat pump. As a result, power consumption may be reduced, and reliability of the operation of the heat pump may be enhanced.

A flow control means 365 may be installed at the exhaustion duct 360. More specifically, the flow control means 365 may be implemented as a damper. Generally, the damper refers to an apparatus for controlling a flow amount of air passing through a duct by being open or closed manually or by a controller.

The flow control means 365 controls a flow amount of air passing through the exhaustion duct such that the heat pump maintains a normal state. More specifically, the flow control means 365 controls a flow amount of air passing through the exhaustion duct such that a temperature of a refrigerant passing through the evaporator is within a predetermined range. Generally, the heat pump may be influenced by an operation temperature of a refrigerant for absorbing and emitting heat. And, the heat pump may be normally operated when a refrigerant is within a preset temperature range, but may be abnormally operated when the refrigerant is not within the preset temperature range.

In this embodiment, the amount of high-temperature and humid air which is to transfer heat to a refrigerant via the evaporator of the heat pump is controlled by the flow control means 365, thereby normally operating the heat pump. Accordingly, the amount of air heat-exchanged with the heat pump is determined within the range that the heat pump maintains a normal state.

Air introduced into the drum through the suction duct may be mixed with air on the circulation duct in the drum. As shown in FIG. 13, the circulation flow path formed by the circulation duct 320, and the suction flow path formed by the suction duct 370 may be united into one in the drum.

For spatial efficiency, as shown in FIG. 16, the suction duct 370 may include the heater 380, and may be configured such that the suction flow path passes through the heater. And, the circulation duct is connected, through a lower portion 325 of the heater, with the suction duct on a rear surface of the drum, and is upwardly extended. However, the suction duct and the circulation duct are configured to be connected to each other at a downstream side of the heater, but not to be communicated with each other. Accordingly, air on the circulation flow path and air on the suction flow path are introduced into the drum without being mixed with each other.

Under this configuration, the circulation flow path and the suction flow path may be completely separated from each other. In this preferred embodiment, it is easy to allow air introduced into the drum to have a higher temperature by the heater, rather than by the heat pump. Accordingly, once the air on the circulation flow path and the air on the suction flow path are discharged into the drum without being mixed to each other, air of a high temperature is formed to obtain a large air volume and to enhance drying efficiency.

As shown in FIG. 14, the suction flow path of the suction duct and the circulation flow path of the circulation duct may be connected with each other at a downstream side 371 of the heater before being introduced into the drum, and then are introduced into the drum.

For spatial efficiency, as shown in FIG. 16, the suction duct 370 may include the heater 380, and may be configured such that the suction flow path passes through the heater. And, the circulation duct 320 is connected, through a lower portion 325 of the heater, with the suction duct on a rear surface of the drum, and is upwardly extended. Accordingly, the suction duct and the circulation duct may be configured to be communicated with each other at a downstream side of the heater.

Under this configuration, the circulation duct and the suction duct are connected with other to be introduced into the drum. In this preferred embodiment, it is easy to allow air introduced into the drum to have a higher temperature by the heater, rather than by the heat pump. Accordingly, once the air on the circulation flow path and the air on the suction flow path are discharged into the drum without being mixed to each other, air of a high temperature is formed to obtain a large air volume and to enhance drying efficiency.

In a case that the circulation flow path and the suction flow path are separately introduced into the drum without being mixed to each other, air may have an ununiform temperature. This may cause high-temperature air to partially occur to damage laundry. Accordingly, for a uniform temperature of air introduced into the drum, air on the circulation flow path and air on the suction flow path are mixed with each other before being introduced into the drum. This configuration may allow a large air volume to be obtained, and prevent damage of an object to be dried.

Third Embodiment

Hereinafter, explanations about the same configurations and components of a third embodiment as those of the first and second embodiments will be omitted.

Figure 18:
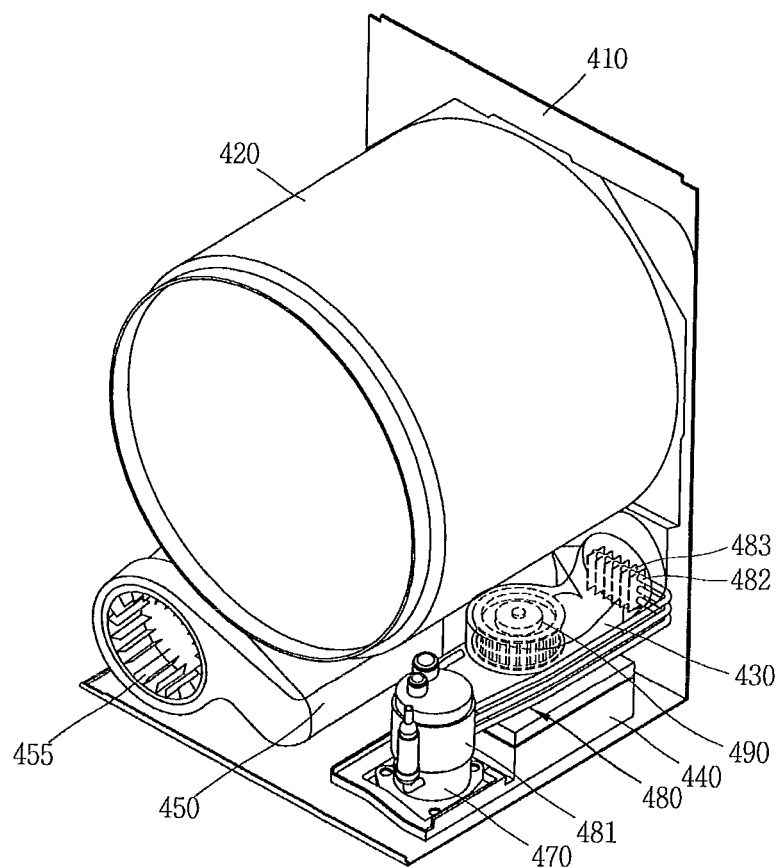
FIG. 18 is a perspective view illustrating the inside of a clothes dryer according to a third embodiment of the present invention.

Referring to FIG. 18, a clothes dryer of the third embodiment of the present invention comprises a body 410 which forms the appearance thereof, and a drum 420 rotatably installed in the body 410. The drum 420 is supported so as to be rotatable by supporters (not shown) disposed at front and rear sides.

At a rear side of the drum, a suction duct 430 is installed in upper and lower side directions of the drum by being extended from a lower portion of the body. The suction duct 430 is installed in the body, and configured to suck external air and to supply the sucked external air into the drum. By the suction duct, formed is a suction flow path through which air sucked into the drum flows.

A first heat exchanger 440 for heating sucked air is provided at the suction duct 430. Like in the first embodiment, the first heat exchanger 440 indicates a condenser. Inside the suction duct, installed is a heater for heating sucked air to a high temperature required for a drying operation, as well as the first heat exchanger 440. A blower 490 for sucking air may be provided in the suction duct.

Air introduced into the drum is heated by the first heat exchanger 440, or by the first heat exchanger 440 and the heater, thereby being converted into high-temperature dry air having a temperature of about 300°. This air introduced into the drum in a high temperature state is used to dry laundry, and then is introduced into a front duct (not shown) disposed at a front lower portion of the drum. Then, the air is exhausted to the outside of the body via a lint filter (not shown) and an exhaustion duct 450, sequentially.

The exhaustion duct 450 is provided with an exhaustion flow path for exhausting hot air discharged from the drum to the outside. This exhaustion flow path may be provided with a blower 455 for sucking air inside the drum and forcibly blowing the air to the outside of the clothes dryer.

Figure 19:
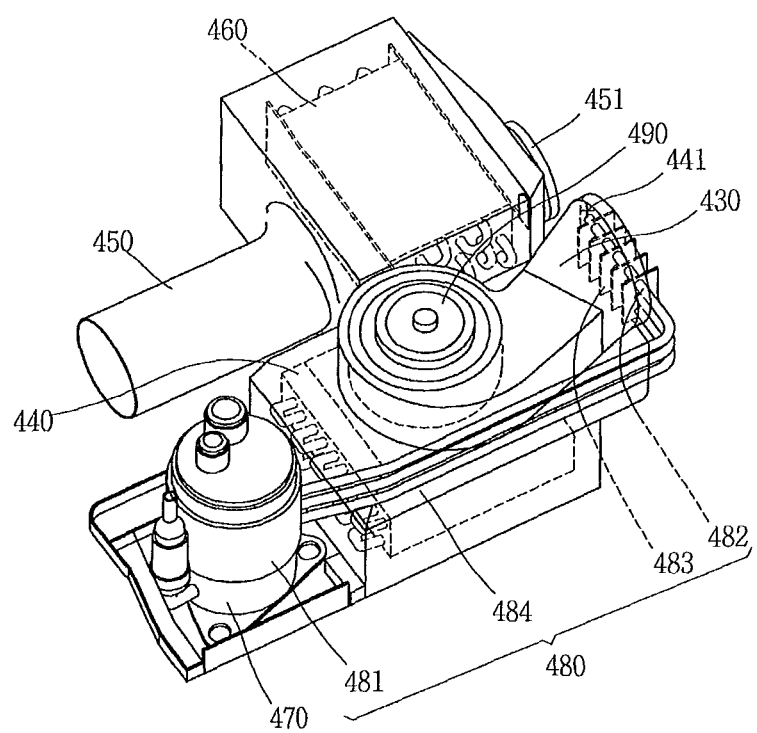
FIG. 19 is an enlarged perspective view of a heat pump of the clothes dryer according to a third embodiment of the present invention.

As shown in FIG. 19, at the exhaustion duct 450, installed is a second heat exchanger 460 for cooling exhausted air. The second heat exchanger 460 is implemented as an evaporator.

As shown in FIG. 19, the clothes dryer constitutes a heat pump by further comprising a compressor 470 and an expander (not shown) installed between the first heat exchanger 440 and the second heat exchanger 460, respectively. That is, the first heat exchanger 440, the expander, the second heat exchanger 460 and the compressor 470 are sequentially connected to one another by pipes, thereby constituting one heat pump. Detailed explanations about the heat pump will be omitted since they were aforementioned in the first embodiment.

The heat pump absorbs waste heat by heat-exchanging with hot air discharged through the exhaustion duct. During this process, the air discharged through the exhaustion duct 45 is cooled to have moisture removed therefrom. Then, the cooled air is exhausted to the outside of the body through an outlet 451 formed at the exhaustion duct in a low temperature and dry state.

As shown in FIGS. 18 and 19, a heat transfer means 480 is installed between the compressor 470 and air of a downstream side 441 of the first heat exchanger. Generally, the compressor has temperature increment during an operation, thus to have a very high surface temperature. Accordingly, when the compressor is overheated, a compression performance may be degraded.

In the third embodiment, heat transfer may be performed, through the heat transfer means 480, between the compressor and air of the downstream side 441 of the first heat exchanger. The air of the downstream side 441 of the first heat exchanger is air pre-heated by the heat pump, and is to be transferred into the drum 420 through the suction duct 430. However, when compared with a case that the compressor is overheated, the air has a lower temperature. Accordingly, it is preferable to enhance energy efficiency by recovering waste heat, rather than to abandon heat of a high temperature generated on the surface of the compressor to the atmosphere.

The heat transfer means 480 is implemented as a heat pipe 484. The heat pipe 484 includes a first heat sink 481 and a second heat sink 482 at both ends thereof. The first heat sink 481 is configured to contact the surface of the compressor.

Figure 20:
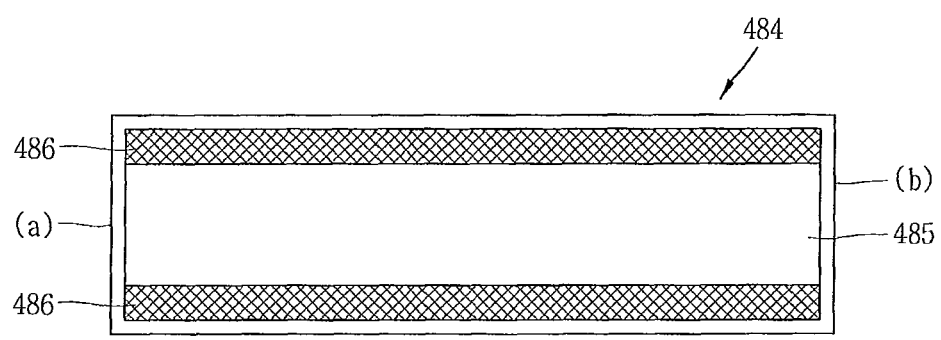
FIG. 20 is a schematic view of a heat pipe, a heat transfer means according to a third embodiment of the present invention.

FIG. 20 illustrates a shape of the heat pipe 484. The heat pipe 484 has a pipe shape of which two ends are sealed, and has a heat transfer medium therein. The heat transfer medium receives heat at a high temperature side connected to one end of the heat pipe, and moves to another end of the heat pipe corresponding to a low temperature side.

More specifically, as shown in FIG. 20, the heat pipe 484 consists of a vapor passage 485 disposed at a central part thereof and through which vapor passes, and wicks 486 formed of a porous material and disposed at edge parts thereof.

For instance, when the first heat sink (a) has a high temperature, a heat transfer medium of the first heat sink is evaporated to move toward the second heat sink (b) via the vapor passage 485. Then, the heat transfer medium is condensed at the second heat sink of a low temperature. The condensed heat transfer medium is moved back to the first heat sink (a) via the wicks 486. This movement of the heat transfer medium is performed by a pressure difference inside the heat pipe, without any transferring means. That is, the evaporated heat transfer medium moves to the second heat sink (b) from the first heat sink (a) by an evaporation pressure. And, the condensed heat transfer medium has a lowered pressure when passing through the wicks 486, thereby moving toward the first heat sink (a) from the second heat sink (b) of a high pressure.

The first heat sink 481 of the heat pipe is configured to contact the surface of the compressor. Once the compressor is operated to have an increased temperature, heat is transferred to the first heat sink contacting the surface of the compressor. This may allow the compressor to be cooled by the heat pipe.

More specifically, when the compressor has a surface temperature more than a preset value, the first heat sink 481 absorbs heat from the compressor, and the second heat sink 482 emits the heat to the air. As the heat transfer medium inside the heat pipe, a refrigerant is generally used. And, an operation temperature and a pressure of the refrigerant may be arbitrarily set. Once a temperature of the heat transfer medium is determined to be suitable not to badly influence on the compressor, and thereby a pressure of the heat transfer medium is set, the heat pipe may be operated within the range of the temperature. This may prevent overheating of the compressor, thereby reducing power consumption, and enhancing reliability of the operation of the compressor.

Alternatively, when the compressor has a surface temperature less than a preset value, the second heat sink 482 may absorb heat from the air of the downstream side 441 of the condenser (first heat exchanger), and the first heat sink 481 may transfer the heat to the compressor for preheating of the compressor. This configuration may be also implemented by pre-setting an operation temperature of the heat transfer medium inside the heat pipe.

Under this configuration, in a case that the compressor 470 is not smoothly operated due to no preheating when the clothes dryer is initially operated, the compressor is preheated by absorbing a predetermined amount of heat from air heated by the first heat exchanger 440. Once the compressor has been sufficiently heated, waste heat discharged from the compressor is absorbed so as to prevent overheating of the compressor. Then, the absorbed waste heat is used to heat air to be introduced into the drum. As the waste heat is efficiently used, overheating of the compressor may be prevented. As a result, power consumption may be reduced, and reliability of the operation of the compressor may be enhanced. Furthermore, an insufficient operation of the compressor occurring when the clothes dryer is initially operated may be prevented by preheating the compressor. This may enhance the performance of the clothes dryer.

As another embodiment of the present invention, the second heat sink 482 may be positioned at the downstream side 441 of the condenser (first heat exchanger), and may be provided with a plurality of heat transfer fins 483 on a surface thereof. This configuration is implemented so as to enhance heat transfer efficiency by using the heat transfer fins.

As still another embodiment of the present invention, the compressor 470 may be positioned at an inlet of the suction duct 430 for more effective implementations of the aforementioned embodiments. Accordingly, recovery of waste heat by the heat transfer means may be performed more efficiently by the natural convection.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A clothes dryer, comprising:
a body;
a drum rotatably installed in the body;
a suction duct installed at the body, and configured to suck external air and to supply the external air into the drum;
an exhaustion duct configured to exhaust air having passed through the drum to outside of the body;
a heat pump having heat exchangers for recovering waste heat by heat-exchanging air passing through the exhaustion duct; and
a circulation duct diverged from the exhaustion duct, and configured to re-supply part of air passing through the exhaustion duct into the drum through circulation,
wherein the heat exchangers comprise a first heat exchanger disposed in the circulation duct for heating air and a second heat exchanger disposed in the circulation duct for cooling air,
wherein the heat pump comprises:
a compressor and an expander connected between the first and second heat exchangers by pipes, and constituting the heat pump,
wherein the suction duct comprises a heater installed at the suction duct to heat sucked air, and
wherein the suction duct and the circulation duct are separately connected to the drum, such that air in the circulation duct and air in the suction duct are independently introduced into the drum without being mixed to each other, and thus air of relatively high temperature, heated by the heater, is contactable directly with the clothes in the drum to enhance drying efficiency.

2. The clothes dryer of claim 1, further comprising a blower provided at an upstream side of the heater.

3. The clothes dryer of claim 1, wherein air passing through the circulation duct is heat-exchanged with the compressor at an upstream side of the first heat exchanger.

4. The clothes dryer of claim 3, wherein the compressor is configured such that a surface thereof is exposed onto the flow path inside the circulation duct.

5. The clothes dryer of claim 1, wherein the exhaustion duct is provided with a damper to control a flow amount of air passing through the exhaustion duct.

6. The clothes dryer of claim 5, further comprising a controller, and the controller controls the damper such that a temperature of a refrigerant having passed through the second heat exchanger is within a preset range.

7. The clothes dryer of claim 6, wherein the controller determines a flow amount of air heat-exchanged with the second heat exchanger within a range that the heat pump maintains a normal state.

8. The clothes dryer of claim 1, further comprising a heat transfer means installed between the compressor and a downstream side of the first heat exchanger.

* * * * *